United States Patent [19]

Brimmer

[11] Patent Number: 4,691,467
[45] Date of Patent: Sep. 8, 1987

[54] BAIT HOLDER AND METHOD FOR MAKING

[76] Inventor: Craig A. Brimmer, 2391-104th St. SE., Monroe, Wash. 98272

[21] Appl. No.: 840,408

[22] Filed: Mar. 13, 1986

[51] Int. Cl.⁴ ............................................. A01K 83/06
[52] U.S. Cl. ....................................... 43/44.4; 43/44.8; 43/42.53
[58] Field of Search ....................... 43/44.4, 44.8, 44.2, 43/42.53

[56] References Cited

U.S. PATENT DOCUMENTS

| | | | |
|---|---|---|---|
| 615,170 | 11/1898 | Henckler | 43/44.8 X |
| 622,206 | 4/1899 | Claflin | |
| 2,158,794 | 5/1939 | Eppel | 43/44.4 |
| 2,463,369 | 3/1949 | Finlay | 43/44.4 |
| 2,982,049 | 5/1961 | Yost | 43/44.8 X |
| 3,047,976 | 8/1962 | Gourlay | 43/44.4 |
| 3,197,912 | 8/1965 | Kramer | 43/44.4 |
| 3,271,890 | 9/1966 | Davis | 43/44.4 X |
| 3,398,477 | 8/1968 | Paluzzi | 43/44.4 |
| 3,935,660 | 2/1976 | Plew | 43/42.53 X |

Primary Examiner—Nicholas P. Godici
Assistant Examiner—Carmine Cuda
Attorney, Agent, or Firm—Seed and Berry

[57] ABSTRACT

A bait holder and method for manufacture are disclosed. In the preferred embodiment the bait holder utilizes a single continuous band of resilient material such as a rubber band, connected to a hookshank or hollow tube at a single point to form two loops. Heat shrinkable tubing is threaded over the loops and shank or hollow tube and is centered over the connection point. Heat is applied to the tubing so that the tubing holds the connection tightly against the shank or hollow tube but allows free axial movement of the loops within the heat shrinkable tubing.

13 Claims, 5 Drawing Figures

BAIT HOLDER AND METHOD FOR MAKING

DESCRIPTION

1. Technical Field

The invention relates to an apparatus and a method for making the same. Specifically, the invention relates to a bait holder for live bait utilizing elastic loops to secure the bait.

2. Background Art

It is well known that the use of live, animated bait for sports fishing achieves superior results as compared to the use of dead or nonmoving artificial bait. A variety of bait harnesses are known in the art which may be used to secure live bait such as sand worms, grasshoppers and crayfish to a fishing lure or hookshank. Typical devices are shown in U.S. Pat. Nos. 3,271,890 issued to Davis, 2,463,369 issued to Finlay et al. and 2,158,794 issued to Eppel. In all of these devices, an elastic band or rubber band is used to secure the live bait to the hook or lure. The device disclosed by Davis is actually a tool to facilitate the insertion of rubber bands over a piece of bait juxtaposed to a hookshank or line.

Finlay et al. discloses a harness structure utilizing hooks to secure a rubber band around the bait. Neither of these devices have achieved any appreciable degree of commercial success.

A more sophisticated device disclosed in U.S. Pat. No. 3,398,477 issued to Paluzzi discloses a device which may be easier to use than the previously discussed devices and which may also be less expensive to construct. However, the Paluzzi device disadvantageously compromises the strength and structural integrity of the hook. In FIGS. 4 and 5 of Paluzzi an elastic string 7 is threaded through a section of heat shrink tubing 11. The shank end 3 containing the eye 2 is connected to one end of the tube 11. The other end of the tube supports the barbed end of the hook. Therefore, the Paluzzi device connects the eye of the hook 2 to the barb portion through a weak link of polyolefin heat shrinkable tubing material. The Paluzzi device also incorporates an inordinate number of manufacturing steps which include the cutting or drilling of the hookshank portions in all the embodiments shown.

Therefore, a need exists for a live bait holder which is inexpensive to manufacture, which securely restrains the bait without demobilizing the bait and which maintains the structural integrity of the hook or lure.

DISCLOSURE OF THE INVENTION

It is an object of the present invention to provide a bait holder for live bait which requires a minimum of manufacturing steps.

It is also an object of the present invention to provide a bait holder which maintains the structural integrity of the hook or lure.

It is yet another object of the present invention to provide a bait holder which achieves improved elastic characteristics so as to securely hold an animated bait animal on the lure without impeding the movement of the animal.

The invention achieves these and other objects which will become apparent from the description which follows by providing an elastic band which is secured to the hookshank at a point to form at least one loop for retaining bait. The band is fixed to the hookshank by a band retainer having an axially extending portion to allow resilient movement of a loop portion along the axis of the hookshank while restraining radial movement of the loop portion away from the shank. In this way, the loop returns to the rest position of a small loop while having the elastic characteristics of a large loop.

In the preferred embodiment, two loops are formed by connecting a single continuous resilient band to the hookshank or lure at a point. The band retainer holds the connection to the shank tightly but has axially extending wing portions which radially constrain the loop portions loosely. Thus, the loop portions are maintained in a spaced apart relation and are free to stretch from the connection of the band to the shank.

The preferred method of construction for the bait holder involves tying the band to the shank at a single point to form two resilient loops. A section of heat shrinkable tubing is used as a band retainer. The retainer is slid over the shank and loops and shrunk upon the application of heat. The band is preferably tied to the shank with a number of wraps of tying materials so as to form a bulge at the connection. This causes the heat shrink tubing to have a smaller diameter on the axial wing portions than on the central portion around the connection. The bulge therefore helps to keep the connection from sliding along the shank.

The described structure of the preferred embodiment is advantageous in that the loops are held in a spaced apart relation wherein each loop has a small rest diameter. However, the loops are free to move resiliently in the axial direction within the band retainer wing sections from the connection point. Therefore, small loops have the resilient characteristic of larger loops.

BEST MODE FOR CARRYING OUT THE INVENTION

Figure 1:
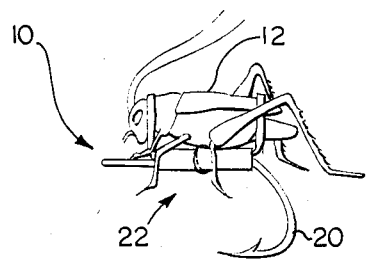
FIG. 1 is a side elevational view of the bait holder of the present invention. A cricket is shown in restraint.

In FIG. 1, a first embodiment of a bait holder, in accordance with the present invention, is generally indicated by reference numeral 10. A cricket 12 is shown in restraint in the holder 10.

Figure 2:
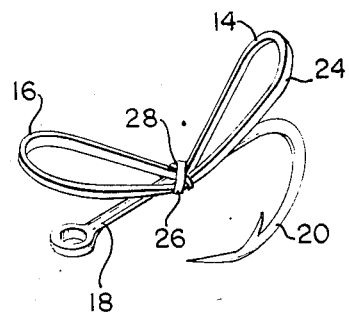
FIG. 2 is an enlarged isometric view showing a first step in the construction of the bait holder.
Figure 3:
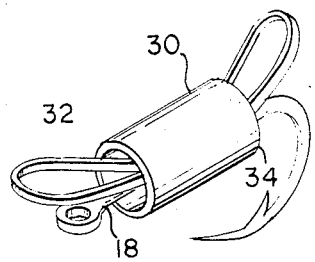
FIG. 3 is an isometric view similar to FIG. 2 in which the second step of construction is shown.
Figure 4:
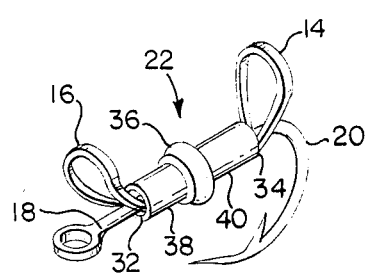
FIG. 4 is an isometric view similar to FIG. 3 showing the appearance of the band retainer after the application of heat to the heat shrink tubing.

FIG. 4 shows an enlarged, isometric view of the holder 10 of FIG. 1. The holder has two loops 14, 16 which are maintained in spaced apart relation on a hookshank 18 of a conventional hook 20 by a band retainer generally indicated by reference numeral 22. FIGS. 2 and 3 show the first and second manufacturing steps respectively for manufacturing the bait holder 10 shown in FIGS. 1–4.

In FIG. 2, a continuous band of resilient material, such as a rubber band 24 is gathered at the center and tied to the center portion of the hookshank 18 at a point 26 on the shank. In this preferred embodiment, the opposite sides of the band 24 are gathered together and tied to the shank by tying material 28 such as that which is commonly used for the tying of artificial fishing flies. The tying material is preferable wrapped about the two sides of the band and the shank at the point 26 in a number of successive layers to form a radially extending protrusion from the band at the point 26. The wraps are preferably completed with half-hitch knots. This construction results in two symmetrical loops connected at an enlarged central bulge.

In FIG. 3, a section of heat shrinkable tubing 30 is used to form the band retainer 22. The tubing is threaded over the shank 18 and loops 14, 16 and centered over the connection point 26. The tubing 30 has a length which is less than the rest length of the band 24 so that the loops 14 and 16 protrude from the ends 32, 34 of the tube as shown in FIGS. 3 and 4.

Heat is applied to the structure of FIG. 3 so that a central portion 36 of the band retainer 22 tightly surrounds the band at the connection point 26. The radially extending protrusion due to the wraps of tying material 28 limits the shrinkage of the tubing at the connection point. This allows axially extending wing portions 38 and 40 to shrink to diameters which are smaller than the diameter of the central portion 36. This variation in diameter prevents the tubing material from sliding off the band 24 and shank 18 when subject to axial forces. The wraps 28 at connection point 26 are also positively located on the shank 18 in this manner to prevent substantial axial movement of the band on the shank after the heating step has been completed. It has been found that such a structure holds the loops in a spaced apart relationship as shown in the figures while preventing substantial radial movement of the loop portions contained in the band retainer wing portions 38 and 40. However, the loops 14 and 16 are free to deform axially from the connection point 26 because the wing portion 38 and 40 loosely surround the loop portions contained therein. It has been found that the required degree of tightness at the central portion 36 and looseness at the wing portions 38 and 40 can be achieved by utilizing polyolefin shrink tubing of ⅛ inch diameter, a 2/0 size hook and a size 10, premium grade rubber band. The tubing 30 of FIG. 3 is heated at a temperature of approximately 240 degrees Fahrenheit in a convection oven for approximately 1-2 minutes.

This structural arrangement is extremely advantageous in that the rest diameter of the loops 14 and 16 is relatively small while the elasticity of the loops is equal to that of loops having rest dimensions shown in FIG. 2. Furthermore the method of construction shown in FIGS. 2, 3 and 4 is extremely simple thus greatly reducing the manufacturing cost of the bait holder 10. Further yet, the conventional hook 20 is not structurally modified so that the structural integrity of the hook is not impaired. It has been found that the holder shown in FIG. 1 (the drawing is approximately life size) has sufficient strength to be successfully used in sport fishing ocean going trout which are commonly known as "steelheads".

Figure 5:
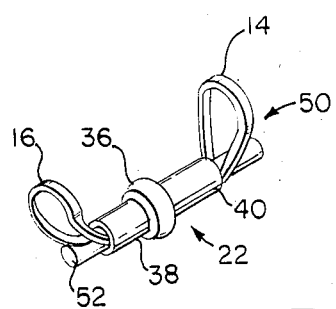
FIG. 5 is an isometric view of a second embodiment of the invention in which the hookshank is replaced by a hollow tube which may be threaded over a fishing line or the shank of a hook.

FIG. 5 illustrates, a second embodiment, generally indicated by reference numeral 50, of the bait holder as shown in FIGS. 1-4. In this embodiment an elongated hollow tube 52 is substituted for the shank 18 of the conventional hook 20 of the first embodiment. In this way, the bait holder 50 may be threaded over a fishing line or a hookshank. This embodiment is constructed in the same manner as the first embodiment.

Other embodiments are also contemplated which are not shown in the drawings but which utilize the same basic inventive concepts as the first two embodiments. For example, a single loop version of the invention may be constructed wherein a loop is connected to a hookshank or hollow tube at a single point and wherein a portion of the loop is contained in a band retainer wing portion to prevent substantial radial movement of the loop portion contained therein while allowing free axial movement of the loop. Other variations and embodiments of the invention are also contemplated. Therefore, the scope of the invention is not to be limited to the above description but is to be determined by the claims which follow.

I claim:

1. A bait holder for fishing hooks of the type having a solid, elongated shank, comprising:
    a continuous band of resilient material connected directly to the shank so as to form two resilient loops; and
    a band retainer having a central portion tightly surrounding the band at the connection to prevent substantial axial movement of the band on the shank and having two axially extending wing portions loosely surrounding portions of the loops to hold the loops apart and to allow resilient axial movement of the loop portions and to prevent substantial radial movement of the loop portions.

2. The bait holder of claim 1, wherein the length of the retainer wing portions is less than the relaxed length of the loops so that the ends of the loops extend through the retainer wing portions.

3. The bait holder of claim 1 wherein the band retainer comprises a section of heat shrinkable material.

4. The bait holder of claim 3, wherein the band retainer heat shrinkable material comprises a cylindrical tube having an unshrunk diameter which is sufficiently large to allow the shank and loops to be threaded therethrough.

5. The process of making the bait holder of claim 4 comprising the following steps:
    placing opposite sides of the band on the shank substantially at a point to form the two loops;
    tying the band to the shank at the point with tying material to form the connection;
    threading the shank and loops through the unshrunk band retainer; and
    heating the band retainer to shrink the central portion thereof tightly around the connection and to shrink the wing portions thereof loosely around the loop portions.

6. The process of claim 5 wherein the step of tying the band includes a step of wrapping successive layers of tying material around the connection to form a radially extending protrusion from the band at the connection so that the wing portions of the band retainer have a smaller diameter than the central portion thereof.

7. The process of claim 5 wherein the step of heating the band retainer is achieved by heating the retainer in an oven at a temperature of approximately 250° F. for a period of approximately 1 to 2 minutes.

8. A bait holder, comprising;
    an elongated hollow tube;
    a continuous band of resilient material connected directly to the hollow tube so as to form two resilient loops; and
    a band retainer having a central portion tightly surrounding the band at the connection to prevent substantial axial movement of the band on the hollow tube and two axially extending wing portions loosely surrounding portions of the loops to hold the loops apart and to allow resilient axial movement of the loop portions and to prevent substantial radial movement of the loop portions.

9. The bait holder of claim 8, wherein the length of the retainer wing portions is less than the relaxed length of the loops so that the ends of the loops extend through the retainer wing portions.

10. The bait holder of claim 8, wherein the band retainer comprises a section of heat shrinkable material.

11. The bait holder of claim 10, wherein the band retainer heat shrinkable material comprises a cylindrical tube having an unshrunk diameter which is sufficiently large to allow the shank and loops to be threaded therethrough.

12. The process of making the bait holder of claim 11, comprising the following steps:

placing opposite sides of the band on the hollow tube substantially at a point to form the two loops;

tying the band to the hollow tube at the point with tying material to form the connection;

threading the hollow tube and loops through the unshrunk band retainer; and heating the band retainer to shrink the central portion thereof tightly around the connection and to shrink the wing portions thereof loosely around the loop portions.

13. The process of claim 12 wherein the step of tying the band includes a step of wrapping successive layers of tying material around the connection to form a radially extending protrusion from the band at the connection so that the wing portions of the band retainer have a smaller diameter than the central portion thereof.

* * * * *